(12) United States Patent
Mansour

(10) Patent No.: US 8,068,877 B1
(45) Date of Patent: Nov. 29, 2011

(54) SYSTEMS AND METHODS OF ANTENNA SELECTION

(75) Inventor: Nagi A. Mansour, Herndon, VA (US)

(73) Assignee: Clear Wireless LLC, Kirkland, WA (US)

( * ) Notice: Subject to any disclaimer, the term of this patent is extended or adjusted under 35 U.S.C. 154(b) by 856 days.

(21) Appl. No.: 11/780,783

(22) Filed: Jul. 20, 2007

(51) Int. Cl.
*H04M 1/00* (2006.01)
*H04B 7/02* (2006.01)

(52) U.S. Cl. ...................................... 455/562.1; 455/101

(58) Field of Classification Search .................. 455/561, 455/562.1, 101, 103, 129
See application file for complete search history.

(56) References Cited

U.S. PATENT DOCUMENTS

| | | | | |
|---|---|---|---|---|
| 6,754,475 B1 * | 6/2004 | Harrison et al. | ........... | 455/115.1 |
| 6,862,456 B2 * | 3/2005 | Sugar et al. | ................... | 455/503 |
| 2004/0042428 A1 * | 3/2004 | Hamalainen et al. | ......... | 370/335 |
| 2005/0025093 A1 | 2/2005 | Yun et al. | | |
| 2006/0079221 A1 * | 4/2006 | Grant et al. | .................... | 455/423 |
| 2006/0109931 A1 | 5/2006 | Asai et al. | | |
| 2007/0153935 A1 | 7/2007 | Yang et al. | | |
| 2007/0224946 A1 * | 9/2007 | Campbell et al. | ............. | 455/101 |
| 2007/0238416 A1 * | 10/2007 | Williams | ................... | 455/67.11 |
| 2008/0049710 A1 * | 2/2008 | Zeira et al. | ..................... | 370/345 |
| 2008/0085738 A1 * | 4/2008 | Li et al. | ...................... | 455/562.1 |

* cited by examiner

*Primary Examiner* — Nguyen Vo

(74) *Attorney, Agent, or Firm* — Crowell & Moring LLP

(57) ABSTRACT

Systems and methods of controlling transmission of communications from a base station to a wireless communication station are provided. When the signal quality of communications between the base station and the wireless communication station are above a predetermined signal quality level, multiple antennas are employed for transmitting such communications. When the signal quality of transmissions by the base station to the wireless communication station are below a predetermined signal quality level, a single antenna is employed for transmitting such communications.

15 Claims, 5 Drawing Sheets

US 8,068,877 B1

SYSTEMS AND METHODS OF ANTENNA SELECTION

BACKGROUND OF THE INVENTION

In wireless communication systems base stations and wireless communication stations communicate with each other using radio frequency signals that are transmitted and received using antennas. Conventionally, base stations and wireless communication stations used a single antenna for transmitting and receiving signals. Recently, multiple input-multiple output (MIMO) techniques have been employed in which multiple antennas are used for transmitting and receiving signals. Processing circuitry coupled to the multiple antennas combine the signals received over the antennas and/or provide copies of the signals to the multiple antennas for transmission.

SUMMARY OF THE INVENTION

Typically, wireless communication systems that employ multiple antennas use multiple antennas for all communications. For example, in WiMAX when a wireless communication station is experiencing good radio frequency conditions, e.g., a high signal-to-noise ratio (SNR), then the base station transmits communications to the wireless communication station over two antennas using spatial multiplexing (SM), and when the wireless communication station is experiencing poor radio frequency conditions, then the base station transmits communications to the wireless communication station over two antennas using space-time coding (STC). In either situation, the base station transmits communications over both antennas at the same power level.

It has been recognized, however, that when a wireless communication station is located at the edge of the base station's coverage area and when the signal quality is low, it is preferable to use a single antenna. For example, when STC is used for a wireless communication station with poor signal quality, the effective power can be 10 Watts, even though each of the two antennas are fed with 10 Watts of power, whereas when the wireless communication station has good signal quality, the effective power can be 20 Watts, i.e., the sum of the 10 Watts of power used for each of the two antennas. Accordingly, in accordance with exemplary embodiments of the present invention, when the signal quality is low, then a single antenna is employed for transmissions to the wireless communication station.

Accordingly, exemplary embodiments of the present invention provide systems and methods for selecting antennas for communications between a base station and a wireless communication station. Specifically, the base station can transmit signals to the wireless communication station using a first communication mode in which multiple antennas are employed. When the signal quality is equal to, or less than, a signal quality threshold, the base station can then transmit signals to the wireless communication station using a second communication mode in which a single antenna is employed. In the second communication mode the power level used for transmissions over the single antenna can be a sum of the power levels used for transmissions over the multiple antennas.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
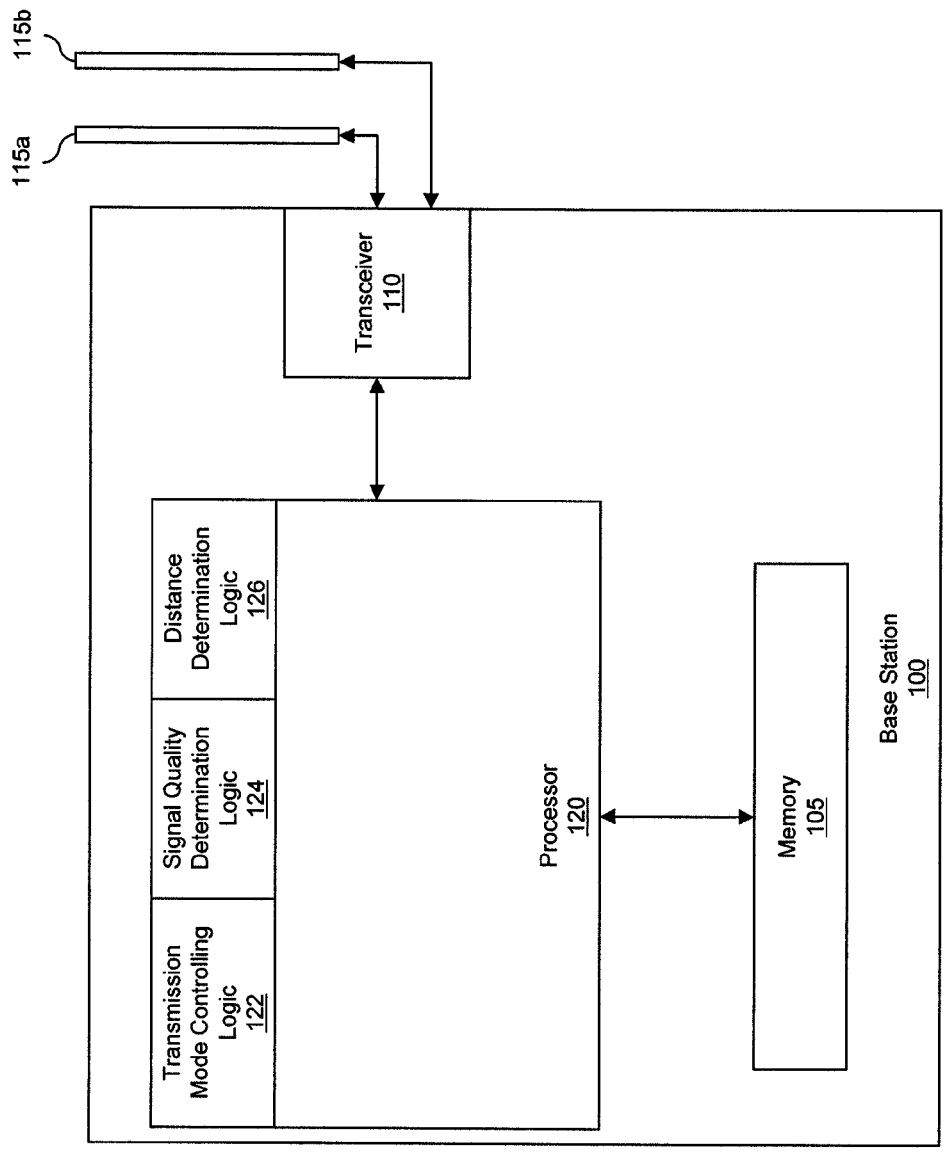
FIG. 1 is a block diagram of an exemplary base station in accordance with the present invention.

FIG. 1 is a block diagram of an exemplary base station in accordance with the present invention. Base station 100 includes processor 120, which is coupled to memory 105 and transceiver 110. Transceiver 110 is coupled to at least two antennas 115a and 115b. Processor 120 includes logic 122-126, which will be described in more detail below in connection with FIGS. 2A and 2B. Processor 120 can be any type of processor, such as a microprocessor, field programmable gate array (FPGA) and/or an application specific integrated circuit (ASIC). When processor 120 is a microprocessor then logic 122-126 can be processor-executable code loaded from memory 105. Base station 100 can communicate with mobile stations in accordance with, for example, WiMAX protocols.

Although. FIG. 1 illustrates only two antennas 115a and 115b being coupled to transceiver 110, more than two antennas can be employed.

Figure 2A:
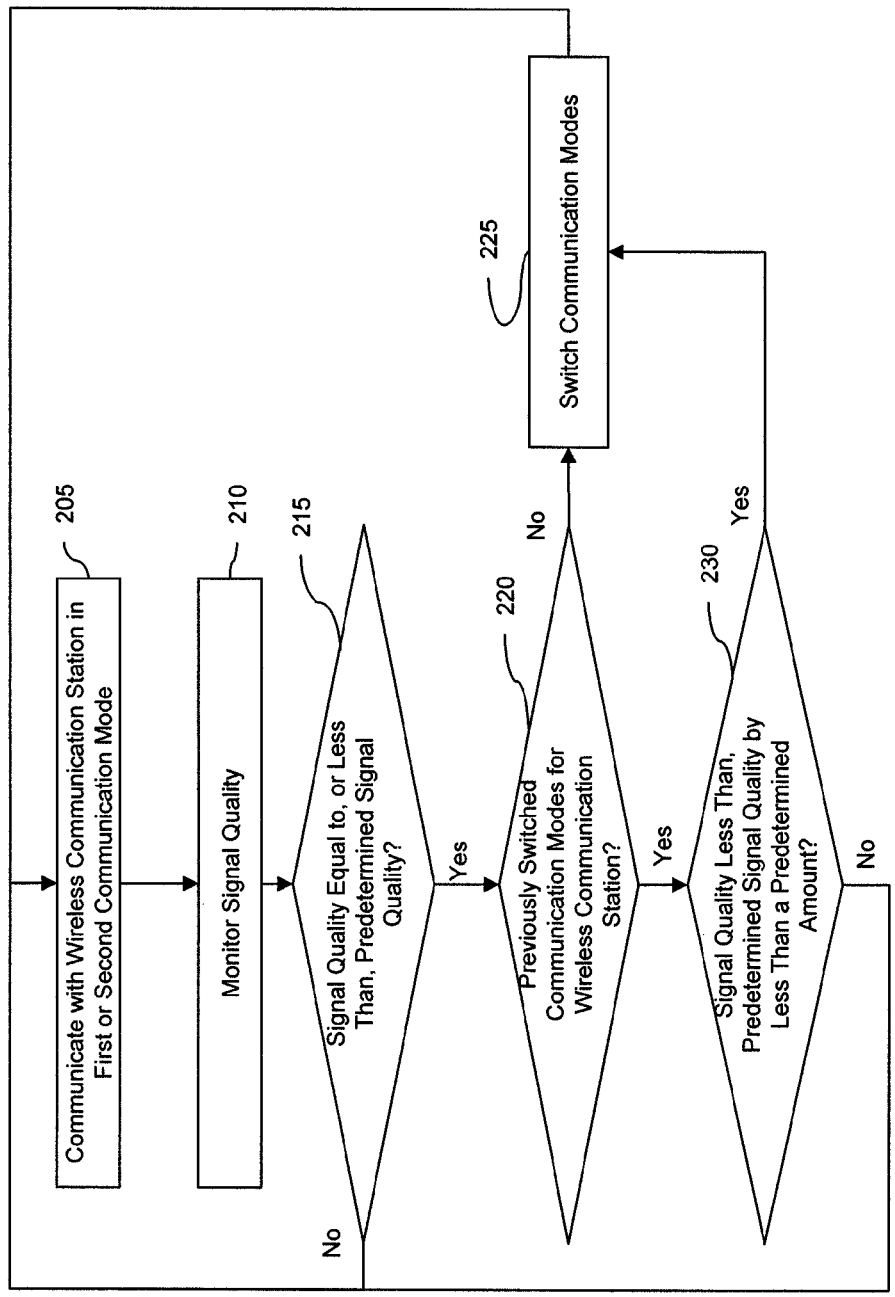
FIGS. 2A and 2B are flow diagrams of exemplary methods in accordance with the present invention.
Figure 2B:
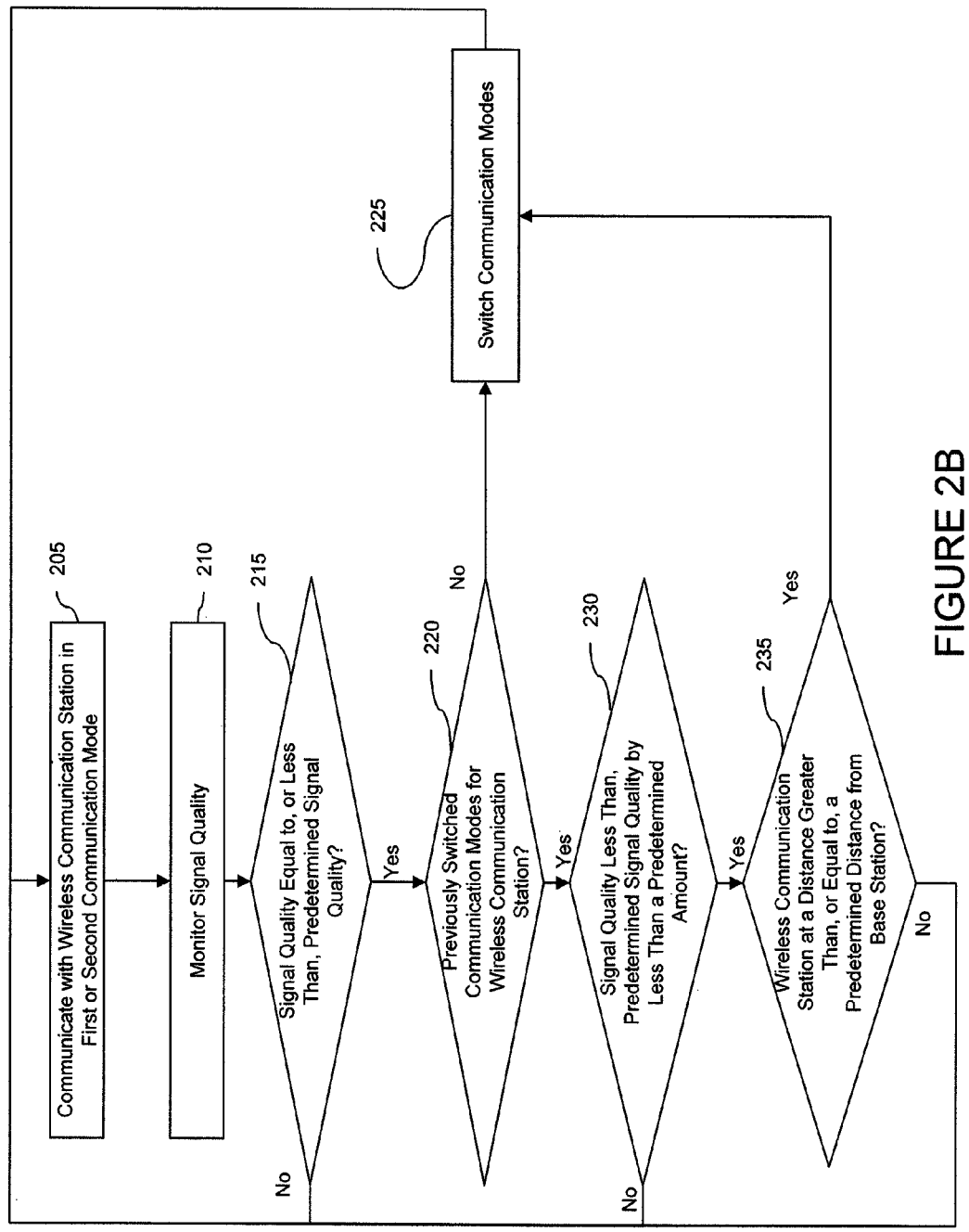
Figure 3A:
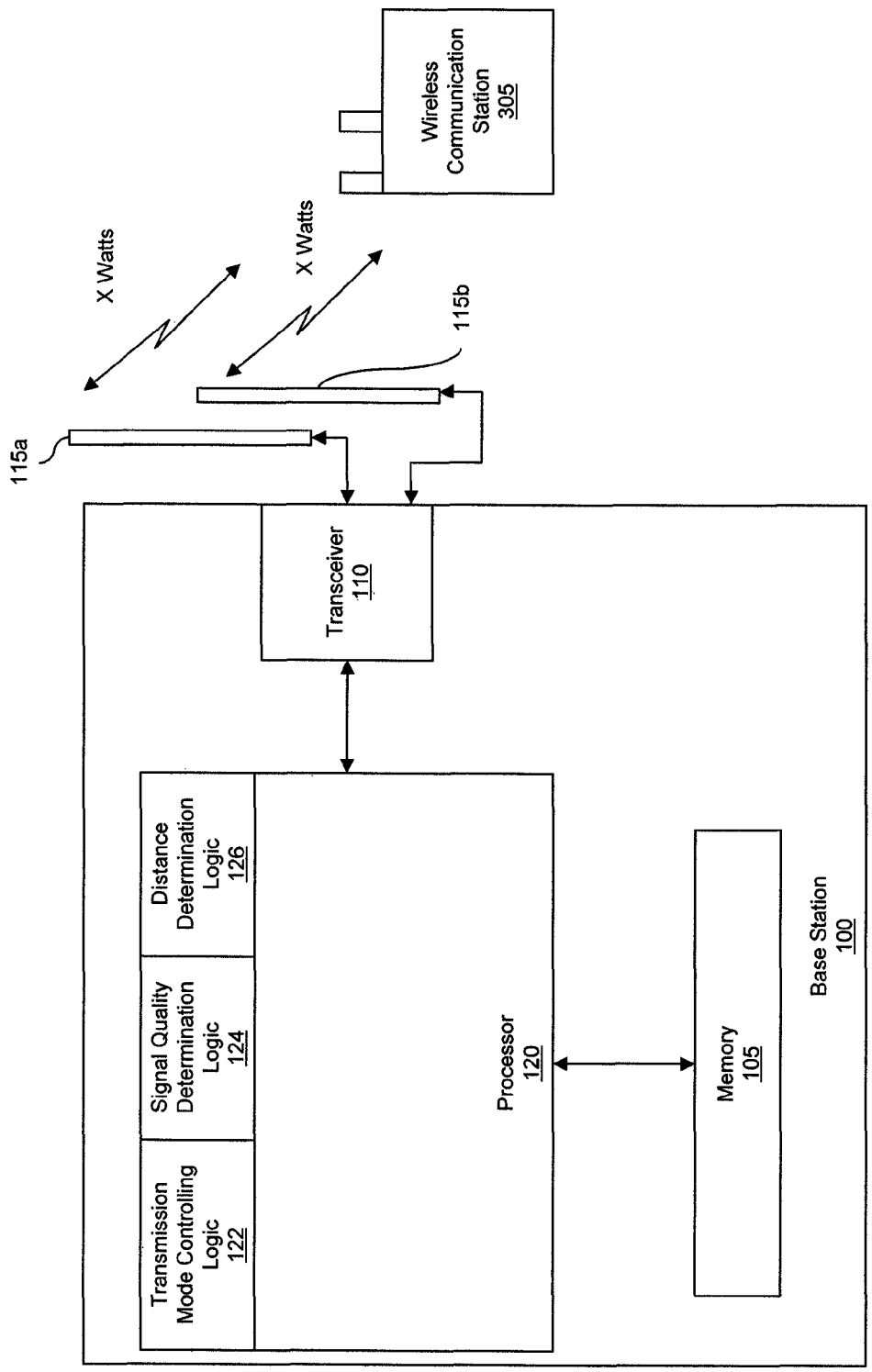
FIGS. 3A and 3B are block diagrams of exemplary systems in accordance with the present invention.
Figure 3B:
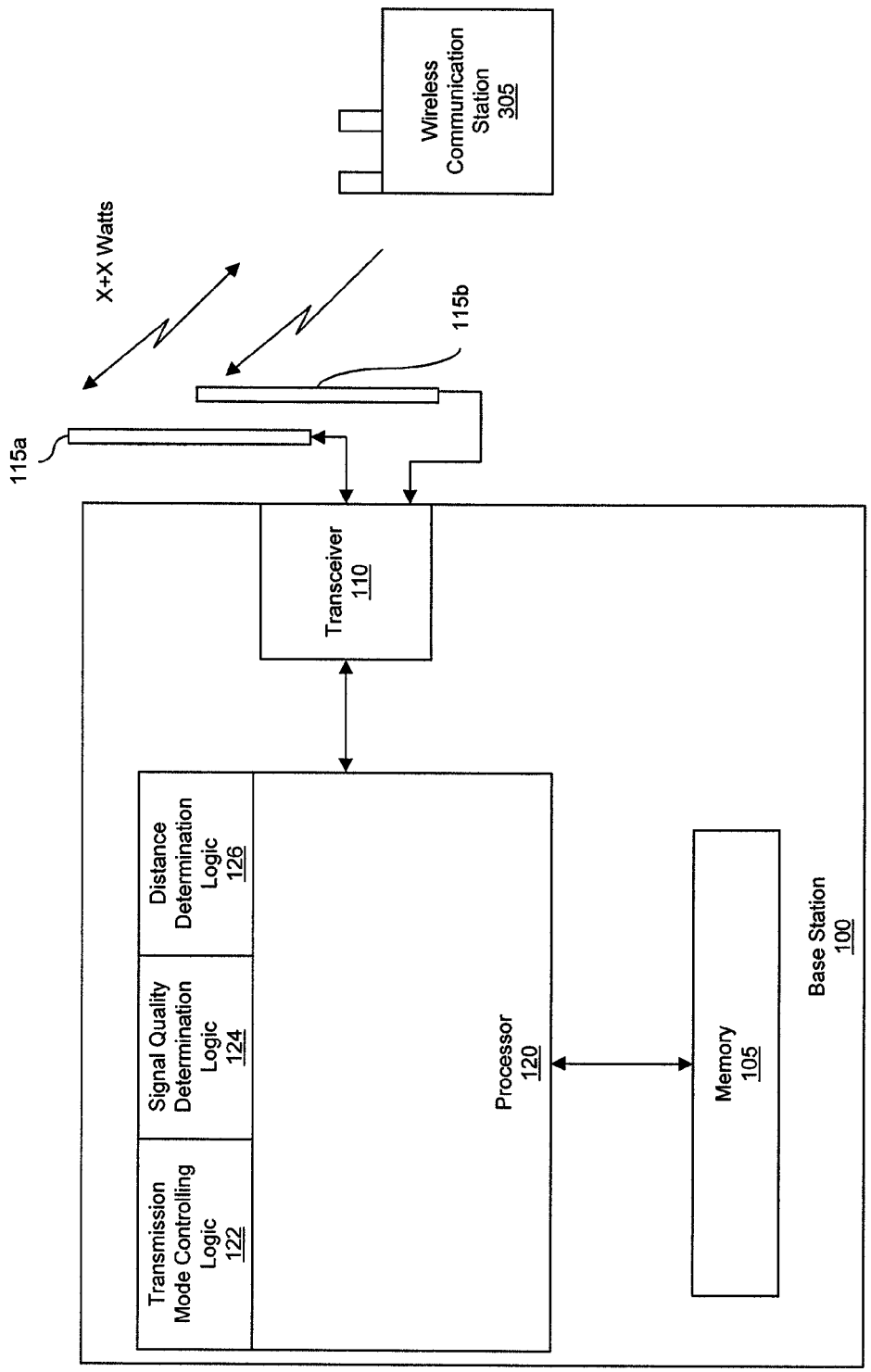

FIGS. 2A and 2B are flow diagrams of exemplary methods in accordance with the present invention. Referring now to FIG. 2A, base station 100 communicates with a wireless communication station in one of a first or second communication mode (step 205). The first communication mode can employ more than one antenna for transmitting communications to the wireless communication station, and the second communication mode can employ a single antenna for transmitting communications to the wireless communication station. FIG. 3A is a block diagram of base station 100 transmitting communications to wireless communication station 205 in the first communication mode and FIG. 3B is a block diagram of base station 100 transmitting communications to wireless communication station 305 in the second communication mode. As illustrated in FIG. 3A, in the first communication mode base station 100 transmits communications to wireless communication station 305 at a power level of X Watts over each of the antennas 115a and 115b. As illustrated in FIG. 3B, in the second communication mode base station 100 transmits communications to wireless communication station 305 over antenna 115a at a power level of X+X Watts, i.e., a sum of the power levels used for transmitting over the two antennas. As also illustrated, antenna 115a is used for both transmitting to, and receiving from, wireless communication station 305, while antenna 115b is only used for receiving from wireless communication station 305.

Returning now to FIG. 2A, while communicating in one of the two communication modes, logic 124 monitors the signal quality (step 210) and determines whether the signal quality is equal to, or less than, a predetermined signal quality (step 215). The predetermined signal quality can be, for example, 12-15 dB. However, the actual predetermined signal quality can be selected depending upon implementation. The signal quality can be measured by, and/or calculated by, the base station and/or the wireless communication station. The present invention can use any type of signal quality measure, including, but not limited to, signal-to-noise ratio (SNR), signal to-interference-plus noise ratio (SINR), carrier to interference-plus-noise ratio (CINR), and/or the like. When the signal quality is greater than the predetermined signal quality ("No" path out of decision step 215), the base station continues to transmit communications to the wireless communication station in the currently selected communication mode, as indicated by logic 122 (step 205).

If, however, the signal quality is equal to, or less than, the predetermined signal quality ("Yes" path out of decision step 215), then logic 122 determines whether the base station has previously switched modes of communication when transmitting to the mobile station (step 220). When the base station has not previously switched modes ("No" path out of decision step 220), then logic 122 causes base station 100 to switch communication modes (step 225), and base station 100 transmits communications to the wireless communication station in the selected communication mode (step 205).

When the base station has previously switched communication modes when transmitting to the wireless communication station ("Yes" path out of decision step 220), then logic 124 determines whether the monitored signal quality is less than the predetermined signal quality by less than a predetermined amount (step 230). The predetermined amount is a hysteresis value that is used to prevent the switching of between communication modes when there has been only a small change in the signal quality. However, this step can be omitted, if desired. As an alternative to, or in addition to, using a predetermined amount of signal quality as a hysteresis value, a predetermined amount of time in which the signal quality is equal to, or less than, the threshold can be employed.

When the monitored signal quality is less than the predetermined signal quality by less than the predetermined amount ("No" path out of decision step 230), then base station 100 continues to transmit communications to the wireless communication station using the currently selected communication mode as indicated by logic 122 (step 205). When the monitored signal quality is less than the predetermined signal quality by more than the predetermined amount ("Yes" path out of decision step 230), then logic 122 causes base station 100 to switch communication modes (step 225), and the base station transmits communications to the wireless communication station using the newly selected communication mode (step 205).

The method of FIG. 2B is similar to that of FIG. 2A, with the addition of a distance determination in step 235. Specifically, when the signal quality is less than the predetermined signal quality by less than a predetermined amount ("Yes" path out of decision step 230), then logic 126 determines a distance between the wireless communication station and base station 100, and whether the distance is greater than or equal to a predetermined distance (step 235). When the determined distance is less than the predetermined distance ("No" path out of decision step 235), then base station 100 continues to transmit communications to the wireless communication station using the currently selected communication mode (step 205). If, however, the distance is equal to or greater than the predetermined distance ("Yes" path out of decision step 235), then logic 122 switches communication modes (step 225) and base station 100 transmits communications to the wireless communication station using the currently selected communication mode (step 205).

Step 235 can be added to the method of FIG. 2A to avoid switching communication modes due to changes in signal quality that are not related to distance from the base station. Specifically, signal quality may deteriorate due to fading, interference and/or obstructions, and it may be desired to switch from multiple antennas to a single antenna only when the signal quality changes are due to distance.

It should be recognized that if the method of FIG. 2A is employed, base station 100 would not need to include logic 126, but could, if desired. Moreover, it should be recognized that the steps of FIGS. 2A and 2B need not necessarily be performed in the particular order as illustrated. For example, step 220 can be performed before step 215. Similarly, step 235 can be performed before step 215. Furthermore, step 235 can replace step 215. In this case, step 230 can be omitted.

Although FIGS. 2A and 2B have been described as using a determination of whether the signal quality is equal to, or less than, a predetermined signal quality, the present invention can instead employ a determination of whether the signal quality is merely less than a predetermined signal quality. Similarly, the distance determination can employ a criteria of whether the wireless communication station is at a distance greater than a predetermined distance, instead of greater than, or equal to, the predetermined distance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of communicating with a wireless communication station, the method comprising the acts of:
   transmitting, by a base station to the wireless communication station, communication signals in a first communication mode, wherein the base station transmits the communication signals over multiple antennas in the first communication mode;
   determining a signal quality measure of the communications with the wireless communication station in the first communication mode;
   determining a distance between the base station and the wireless communication station; and
   transmitting, by the base station to the wireless communication station, communication signals in a second communication mode when the determined signal quality measure is less than a predetermined signal quality measure and when there is a predetermined distance between the base station and the wireless communication station, wherein the base station transmits the communication signals over a single one of the plurality of antennas in the second communication mode,
   wherein the base station transmits the communication signals at a same power level over each of the multiple antennas in the first communication mode and the base station transmits the communication signals over the single antenna at a power level equal to a sum of the power levels used for transmission over the multiple antennas in the second communication mode.

2. The method of claim 1, wherein the base station and wireless communication station communicate in accordance with WiMAX protocols.

3. The method of claim 1, wherein the first communication mode involves multiple input multiple output (MIMO) processing.

4. The method of claim 1, further comprising the act of:
   determining whether the determined signal quality measure is less than a predetermined signal quality measure for a predetermined amount of time, wherein the base station transmits communication signals in the second communication mode when the determined signal quality measure is less than a predetermined signal quality measure for a predetermined amount of time.

5. The method of claim 1, further comprising the acts of:
determining a signal quality measure of the communications in the second communication mode; and
switching, by the base station, transmissions to the wireless communication station from the second communication mode to the first communication mode when the determined signal quality measure in the second communication mode exceeds the predetermined signal quality measure by a predetermined amount.

6. A base station, comprising:
a transceiver;
at least two antennas coupled to the transceiver;
a memory; and
a processor coupled to the transceiver and memory, wherein the processor includes
transmission mode controlling logic to control transmissions, by the base station to a wireless communication station, of communication signals in a first communication mode, wherein the base station transmits the communication signals over the at least two antennas in the first communication mode;
distance determination logic that determines a distance between the base station and the wireless communication station; and
signal quality determination logic that determines a signal quality measure of the communications with the wireless communication station in the first communication mode, wherein the transmission mode controlling logic controls transmissions, by the base station to the wireless communication station, of communication signals in a second communication mode when the determined signal quality measure is less than a predetermined signal quality measure and when there is a predetermined distance between the base station and the wireless communication station, wherein the base station transmits the communication signals over a single antenna in the second communication mode,
wherein the base station transmits the communication signals at a same power level over each of the at least two antennas in the first communication mode and the base station transmits the communication signals over the single antenna at a power level equal to a sum of the power levels used for transmission over the at least two antennas in the second communication mode.

7. The base station of claim 6, wherein the base station and wireless communication station communicate in accordance with WiMAX protocols.

8. The base station of claim 6, wherein the first communication mode involves multiple input multiple output (MIMO) processing.

9. The base station of claim 6, wherein the signal quality determination logic determines whether the determined signal quality measure is less than a predetermined signal quality measure for a predetermined amount of time, wherein the base station transmits communication signals in the second communication mode when the determined signal quality measure is less than a predetermined signal quality measure for a predetermined amount of time.

10. The base station of claim 6, wherein the signal quality determination logic determines a signal quality measure of the communications in the second communication mode, and the transmission mode controlling logic switches transmissions from the base station to the wireless communication station from the second communication mode to the first communication mode when the determined signal quality in the second communication mode exceeds the predetermined signal quality measure by a predetermined amount.

11. A method of communicating with a wireless communication station, the method comprising the acts of:
transmitting, by a base station to the wireless communication station, communication signals in a first communication mode, wherein the base station transmits the communication signals over multiple antennas in the first communication mode;
determining a signal quality measure of the communications with the wireless communication station in the first communication mode;
determining a distance between the base station and the wireless communication station; and
transmitting, by the base station to the wireless communication station, communication signals in a second communication mode when the determined signal quality measure is less than a predetermined signal quality measure and when there is a predetermined distance between the base station and the wireless communication station, wherein the base station transmits the communication signals over a single one of the plurality of antennas in the second communication mode.

12. The method of claim 11, wherein the base station transmits the communication signals at a same power level over each of the multiple antennas in the first communication mode and the base station transmits the communication signals over the single antenna at a power level equal to a sum of the power levels used for transmission over the multiple antennas in the second communication mode.

13. The method of claim 12, wherein the base station and wireless communication station communicate in accordance with WiMAX protocols.

14. The method of claim 12, wherein the first communication mode involves multiple input multiple output (MIMO) processing.

15. The method of claim 12, further comprising the act of:
determining whether the determined signal quality measure is less than a predetermined signal quality measure for a predetermined amount of time, wherein the base station transmits communication signals in the second communication mode when the determined signal quality measure is less than a predetermined signal quality measure for a predetermined amount of time.

* * * * *